Jan. 12, 1965   R. C. WICKENDEN   3,164,998
ACCELEROMETER

Filed Sept. 4, 1962  2 Sheets-Sheet 1

*INVENTOR.*
ROGER C. WICKENDEN
BY
P. H. Fisht
ATTORNEY.

Jan. 12, 1965   R. C. WICKENDEN   3,164,998
ACCELEROMETER
Filed Sept. 4, 1962   2 Sheets-Sheet 2
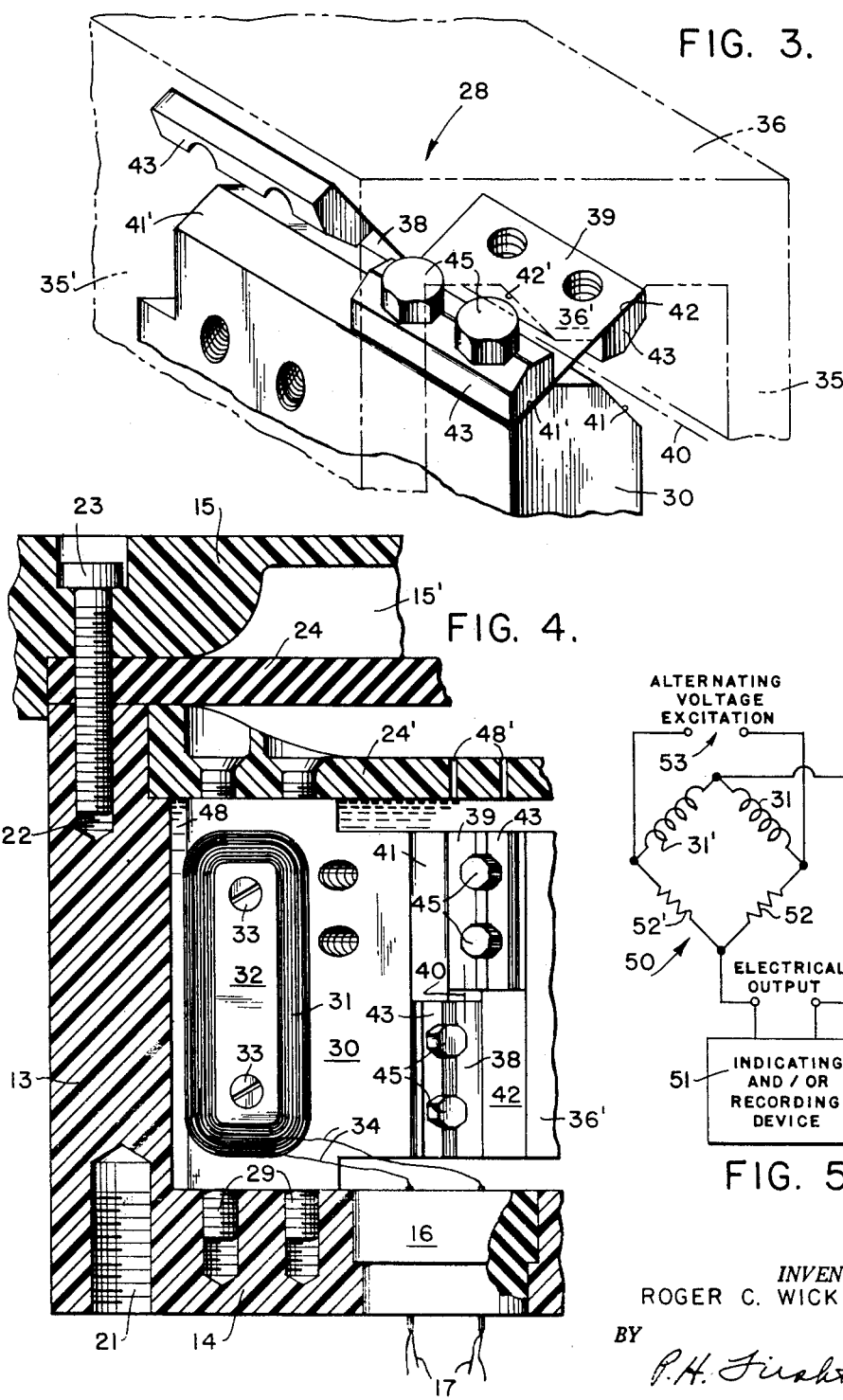
INVENTOR.
ROGER C. WICKENDEN
BY
P. H. Fischt
ATTORNEY.

ced Jan. 12, 1965

3,164,998
ACCELEROMETER
Roger C. Wickenden, China Lake, Calif., assignor to the United States of America as represented by the Secretary of the Navy
Filed Sept. 4, 1962, Ser. No. 221,391
6 Claims. (Cl. 73—516)
(Granted under Title 35, U.S. Code (1952), sec. 266)

The invention herein described may be manufactured and used by or for the Government of the United States of America for governmental purposes without the payment of any royalties thereon or therefor.

This invention relates, generally, to the measurement of displacements and acceleration, and more particularly to a novel angular accelerometer for measuring the acceleration and deceleration angularly imparted to a body about a given axis.

One mode of measuring angular acceleration is to pivotally mount a seismic mass, or rotor, on a support, or stator, about an axis so disposed as to permit the mass to rotate about the axis with respect to the support. A spring restraint is imposed upon the mass to urge it to assume a single equilibrium rotational position with respect to the support. When the mass is displaced in rotation from its equilibrium position through a force acting to rotate it about the axis, the spring imposes a counter-acting restraining torque, which torque is proportional to the acceleration of the mass, tending to counter-rotate the mass about the axis in an equilibrium restoring direction. Where the strength of the spring is sufficient to insure that the motion of the seismic mass or rotor will closely follow that imparted to the support or stator, the angular acceleration imparted to the support will be closely approximated by an angular acceleration of the mass imparted through the spring, and likewise, the angular acceleration of the mass will closely approximate the angular acceleration of any object to which the support is rigidly affixed. In such a device, when a mechanical spring obeying Hooke's law is utilized, the rotational displacement of a rotor or seismic mass with respect to the stator is proportional to the restoring torque imparted to the rotor through the spring. Therefore, since the restoring torque is proportional to the acceleration of the rotor, the acceleration of which approximates the acceleration of the stator, the displacement of the rotor may be measured to determine the acceleration of the stator. A measurement of the displacement of the rotor may be accomplished through the use of electrical pickoff devices, such as, for example, an electrical potentiometer, a differential transformer, or a variable reluctance measuring means, and will serve to indicate the restoring torque being applied through the spring to the rotor and consequently the acceleration of stator may be determined. In this manner the angular acceleration imposed on the rotor of the accelerometer, and to the body to which the accelerometer is fixed, may likewise be accurately determined.

In the field of force and acceleration measurement the use of angular accelerometers, of the class utilizing the above-described principles, has been restricted in certain areas such as missile guidance, for example, due to certain limiting factors, such as the bulk size, low resonant frequency, low sensitivity, complex construction, and general fragility, which are characteristic of the prior art devices.

The general purpose of this invention is to provide an angular accelerometer which embraces the above-described principles and the attendant advantages while removing the aforedescribed limiting factors and disadvantages.

Therefore, broadly stated, it is a general object of this invention to provide a simple and rugged compact electrical device having a high sensitivity and being capable of adjustment for providing an accurate and continuous electrical output indicative of significant angular acceleration being imposed on a body, while being insensitive to angular velocity and linear acceleration.

A further object is to provide an angular accelerometer having a minimum of components to thus increase the simplicity and the rigidity of the device.

Another object is to provide an angular accelerometer having the components thereof so arranged as to permit the device to be mounted in a minimum of space and operative to render accurate indications when mounted at any given angle.

Still another object is to provide an angular accelerometer having the components thereof so arranged and balanced as to allow a mounting of the device for measuring acceleration about a vertical, a horizontal, or oblique axis.

Other objects, advantages and novel features of the invention will become apparent from the following detailed description of the invention when considered in conjunction with the accompanying drawings wherein:

FIG. 3 is a fragmentary perspective schematic view of the stator, rotor and flexible pivot sub-assembly illustrating their disposition relationship;

FIG. 4 is a fragmentary elevational section taken generally along lines 4—4 of FIG. 2;

FIG. 5 is a schematic showing the electrical circuit of the device; and

Figure 1:
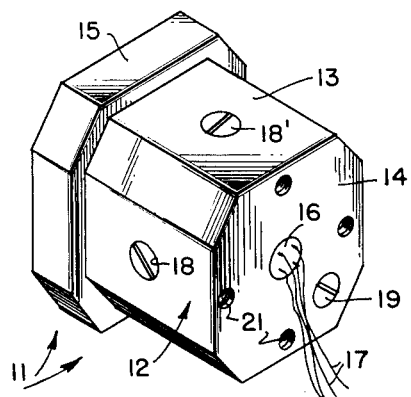
FIG. 1 is a perspective view of the assembled accelerometer device.

Referring now more specifically to the drawings wherein like reference numerals are used to designate the same or like parts throughout the specification, an assembled accelerometer, shown in FIG. 1 and generally designated by the reference numeral 11, is provided with a casing 12, made of any suitable material, such as a metal, or a plastic as is shown, having wall portions 13, a base 14 and a removable top cover member 15. Disposed in the base portion 14 is an electrical connecting and casing sealing plug 16, and extending therefrom are electrical leads 17 which extend to a source of alternating current and to a bridge circuit hereinafter described. The wall portions 13 are provided with a plurality of internal access openings 18 in which are threaded screws 18' for sealing the openings in a conventional manner. The base portion is likewise provided with an access opening and a sealing screw 19 threaded therein. Also, within the base portion, there are threaded holes 21 provided for mounting the device in operative relationship with a given body, the angular acceleration of which is to be determined.

Figure 2:
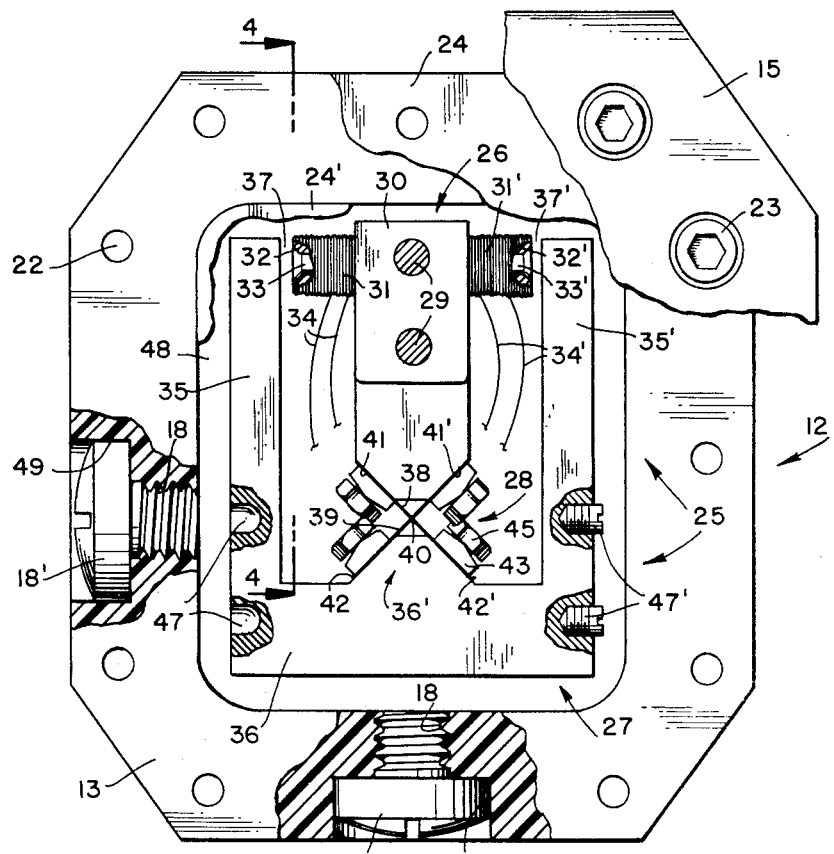
FIG. 2 is a partially sectioned plan view, on a larger scale, of the device of FIG. 1 with cover and casing portions partially cut away for showing the relationship of various components thereof.

Turning now to FIG. 2, the wall portions 13 are provided with threaded holes 22 for receiving screws 23 which secure the cover 15 to the casing 12. An expansion diaphragm 24, formed of a suitable elastic material, is disposed beneath an expansion recess 15' formed in the cover 15 (FIG. 4) and is secured to the wall portions of the casing by suitable means, for example, the screws 23, in order to compensate for thermal expansion of a later described damping fluid contained within the casing. Beneath the diaphragm 24 there is positioned a plate-type baffle 24', the purpose of which will become apparent with a subsequent description thereof.

Within the casing 12, beneath the baffle 24', there is disposed an inductance assembly, generally designated by the reference numeral 25, comprising a stator sub-assembly 26, an M-shaped rotor sub-assembly 27, and a flexible pivot sub-assembly 28 for interconnecting the stator and rotor sub-assemblies. The inductance assembly 25 is mounted by means of anchor screws 29 extending through the baffle 24' and through openings provided near one end of an elongated stator body 30 of the stator sub-assembly, and threaded into the base 14 of the casing 12 to rigidly secure the assembly 25 to the casing 12.

Located at opposite sides of the stator body 30, adjacent an end portion thereof, are inductance coils 31 and 31' mounted by means of stator wings 32 having mounting studs 33 passing therethrough and into the body 30. The coils 31 and 31' are provided with pairs of electrical leads 34 and 34' which extend to the connecting and sealing plug 16 to connect the coils with leads 17. The M-shaped rotor sub-assembly 27 is formed with a pair of legs 35 and 35' extending at right angles from opposite end portions of a rotor body 36 so as to be disposed opposite the stator body 30 in spaced relationship with the inductance coils 31 and 31' to thus form air gaps 37 and 37'.

The interconnecting flexible pivot sub-assembly 28 comprises a pair of flat spring members 38 and 39 disposed in planes which are arranged at right angles to each other and which intersect along a common axis about which the springs are to be mutually flexed to thus establish an axis through the center of gravity of the rotor, hereinafter referred to as a pivot axis, which axis is illustrated by dotted lines and designated by reference numeral 40 in FIG. 3. As is more clearly shown in FIG. 3, the springs 38 and 39 are provided with screw openings at the end portions thereof, in order that the springs may be secured to diagonal face portions 41 and 41' of the stator body 30, and are arranged in a mutually off-set relationship in order to allow the springs to extend in the aforesaid planes in non-obstructing fashion. The opposite end portions of springs 38 and 39 are secured to the body 36 of the M-shaped rotor at diagonal face portions 42 and 42' formed at a rotor mounting portion 36', FIG. 2. For securing the springs of the pivot sub-assembly 28 to the stator and rotor sub-assemblies in interconnecting relationship, there are provided four screw mounted spring clamping blocks 43, each of similar construction. As each of the blocks is similarly constructed only one will be described. As best seen in FIG. 3, block 43 is placed in facing relation with an end portion of the spring 39 so that screws 45 may be passed through holes in the block and the spring and be threaded into the face portion 41' of the stator body 30 to thus secure the spring 39 thereto. The other blocks 43 serve to secure the remaining ends of springs 38 and 39 in like fashion. The springs have been shown as clamped by blocks and screws, however, it is to be understood they could be secured by other means, such as, for example, an epoxy resin.

The parts are designed and arranged so that the moments of inertia about every axis, which is perpendicular to the pivot axis 40 and which passes through the center of gravity of the rotor, are equal. As a result of the established equality of the moments of inertia, the device will be sensitive to angular acceleration, while being insensitive to linear acceleration and angular velocity. Therefore, the air gaps 37 and 37' will be caused to vary in accordance with the instant angular acceleration being measured and will not be affected by any linear acceleration or angular velocity which may simultaneously be imposed thereon.

From the foregoing, it is to be understood that the rotor sub-assembly 27 of the inductance assembly 25 is free to flex the springs 38 and 39 and thus to rotate about the pivot axis 40 to displace the legs 35 and 35' with respect to the inductance coils 31 and 31' so as to vary the air gaps 37 and 37'. To balance the rotor 27 about the pivot axis 40, holes 47 may be drilled and threaded stud screws 47' provided as necessary. Shimming or abraiding techniques have been found satisfactory for adjusting the dimensions of the air gaps 37 and 37'.

In order to damp rotation of the rotor sub-assembly 27 about the pivot axis 40, and to thus eliminate undesired rotational vibrations and the attendant consequences, the entire inductance assembly 25 may be immersed in a liquid 48, for example, a bath of silicone oil, which is introduced into the assembled device through the access openings 18. The baffle plate 24' is provided with a plurality of orifices 48', FIG. 4, which permits the liquid 48 to pass through the baffle plate. A gasket material may be provided adjacent surfaces 49 of the access openings 18 to aid in forming a leak-proof seal at the openings 18 in order to maintain the liquid within the casing when the openings are closed by the threaded screws 18'.

For obtaining an electrical output indicative of angular acceleration imposed on the body to which the accelerometer is affixed, a bridge circuit 50 of conventional design is provided to be connected with an indicating and/or calibrated recording device 51, schematically illustrated in FIG. 5. Two arms of the bridge circuit 50 contain the aforementioned impedance forming inductance coils 31 and 31', which form an impedance and for the purposes of describing the present invention are considered to have equal inductance and resistance values. The remainder of the bridge circuit has within its two arms resistors 52 and 52', which, likewise, are considered to be of equal resistance. An alternating current voltage source 53 is provided for exciting the bridge circuit. Changes in output of the circuit are caused by changes in the inductive reactance of the coils brought about by changes in the air gaps 37 and 37' located, as aforedescribed, between the coils 31 and 31' and their respective rotor arms 35 and 35'. Therefore, since the inductive reactance of one coil will increase proportionally as its air gap decreases and, simultaneously therewith, the inductive reactance of the other coil will decrease proportionally as its air gap increases, the change in voltage output will be proportional to the displacement of the rotor arms and will be in phase, or 180° out of phase, with the exciting alternating current depending upon the direction the rotor is deflected from its equilibrium position about its flexible pivot. This change is then discernable at the indicating device and may be indicated and recorded as the needs dictate.

Figure 6:
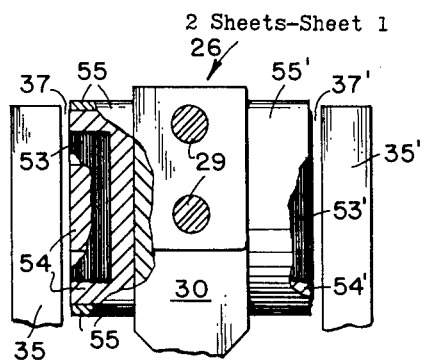
FIG. 6 is a fragmentary plan view of an assembled stator and rotor, showing modified coils and mounting, with parts broken away.

While inductance coils of the configuration shown in FIG. 2 are entirely satisfactory for given conditions, another configuration which may be utilized in place of coils 31 and 31' in stator wings 32 and 32' to provide for an increased sensitivity of the device is that shown in FIG. 6, wherein inductance coils 53 and 53' placed in cup cores 54 and 54' made of a ferrous or high permeability magnetic material having minimal eddy current losses are secured to the stator body by supports 55. Coils 53 and 53' react in a similar manner as previously described in connection with the inductance coils 31 and 31'.

In operation, the assembled angular accelerometer 11 is mounted on a given movable object or body, such as a missile, aircraft, sled, or the like, the angular acceleration of which is to be determined. The device is mounted by means of screws inserted in the mounting holes 21 of the casing base 14, so as to maintain the stator of the accelerometer fixedly positioned with respect to the given object or body so that the angular acceleration to be determined will occur about the pivot axis 40 of the flexible pivot sub-assembly 28. When an angular accelerating force is imposed on the given object or body, the flat spring members 38 and 39 tend to flex about the pivot axis 40, under the influence of the inertia of the mass of the rotor sub-assembly 27, thus allowing the legs 35 and 35' of the rotor to simultaneously vary the air gaps 37 and 37' thus effecting a change in the inductive reactance of the inductance coils 31 and 31'. The change effected in the inductive reactance of the coils is proportional to the relative displacement of the legs 35 and 35' of the rotor and is detected by means of the bridge circuit 50. The displacement is then indicated at the indicating and/or recording device 51 and the indication then used to determine the torque being applied by the springs 38 and 39 tending to restore the rotor sub-assembly to its equilibrium position. Since the angular acceleration of the rotor is proportional to the restoring torque being applied to the rotor, and the angular acceleration of the rotor approximates that of the body to which the accelerometer is affixed, the angular acceleration of the object or body may be accurately determined.

Obviously many modifications and variations of the present invention are possible in the light of the above teachings. It is therefore to be understood that within the scope of the appended claims the invention may be practiced otherwise than as specifically described.

What is claimed is:

1. An apparatus for measuring angular acceleration imparted to a body about a given axis comprising: a casing having a base, wall portions and a cover; an elongated stator having first and second ends disposed within said casing and rigidly fixed at said first end to said base; a rotor having an elongated body portion and a pair of substantially elongated legs extending in a common direction from the body portion at opposite ends thereof and at right angles thereto; a flexible pivot means disposed in a location between said second end of the stator and the body portion of the rotor to thereby provide a flexible interconnection between the stator and the rotor and whereby the legs of the rotor are movably disposed along opposite sides of the flexible pivot and at opposite sides of the stator in spaced relation thereto; a pair of variable inductance pick-off coils mounted at opposite sides of the stator and located adjacent but spaced from said legs so as to form a pair of variable air gaps therebetween; means for supplying an alternating current excitation voltage in said coils; an electrical bridge circuit connected with said inductance coils to discern any significant changes of inductances in said coils created through changes in said air gaps; and a calibrated indicating means connected with said bridge circuit so that any significant angular acceleration imparted to the rotor about the flexible pivot will cause a variance in the air gaps to thus effect a corresponding change of inductance discernable at said bridge and measurable at said indicating means.

2. An apparatus for measuring angular acceleration as defined in claim 1, further characterized in that the flexible pivot means comprises a pair of flat springs lying in planes intersecting at right angles and being so arranged between the rotor body and the second end of the stator as to locate the line of intersection of the planes in spaced relationship with the rotor and stator to thus provide a pivot axis therebetween.

3. An apparatus for measuring angular acceleration as defined in claim 2, further characterized in that liquid is deposited within the casing to provide a damping effect on the legs of the rotor.

4. In an angular acceleration detecting device of the type utilizing a pivotally interconnected stator member and rotor member and electrical "pick-off" coils for providing an indication of significant angular acceleration imparted to the device, the combination comprising:

an elongated stator member having a first end rigidly fixed to a selected portion of the device;

a flexible pivot means adjacent a second end of said stator member including a pair of adjacent, elongated spring members so arranged as to separately be disposed in planes intersecting at right angles with respect to each other;

a rotor member including an elongated body spaced from the second end of said stator member extending along a longitudinal axis perpendicular to the longitudinal axis of said elongated stator member, and a pair of spaced, elongated legs extending in a common direction from said body at right angles with respect the body's longitudinal axis and being so arranged as to be disposed in a displaced relationship at opposite sides of the pivot means and the second end portion of said stator member;

means for securing first ends of the spring members to the second end of the stator member in a manner such that each of the spring members are caused to extend diagonally across the longitudinal axis of the stator member; and spring mounting means for securing the second ends of the spring members to the body of said rotor member in a manner such that a pivot axis is established along a line defined by the plane's intersection to extend in a direction perpendicular to the longitudinal axis of said body and said stator member, whereby the springs may be flexed under influences of inertial forces acting thereon in response to forces of angular acceleration acting on the device in a direction which serves to initiate rotor body rotation about said pivot axis.

5. The device as defined in claim 4, being further characterized in that the body, legs and spring mounting means of the rotor impart an M-shaped configuration thereto with the legs thereof being of a predetermined length, whereby the moments of inertia of the rotor, about the rotor member's two principal axes perpendicular to the pivot axis may be made identical.

6. In an angular accelerometer, means comprising:

a rotor member having an elongated body portion and a pair of elongated legs fixed to said body, in spaced relationship with respect to each other and extending in a common direction at right angles from said body;

a stator member including, an elongated body so arranged as to be disposed between said legs in spaced relationship with respect to the legs and to the body of said rotor member in a manner such that the longitudinal axes of said bodies are disposed at 90° with respect to each other, and a pair of electrically excited inductance coils mounted at opposite sides of the elongated body of said stator member and arranged so as to be slightly displaced from said legs;

a flexible pivot means interposed between the displaced bodies including, a pair of elongated and mutually off-set flat spring members, each lying in a separate plane disposed at 90° with respect to the other and intersecting along a line displaced from each of the bodies to establish a pivot axis extending along a line established by the intersection of said planes; and clamping means securing one end of each of the spring members to the elongated body of the rotor and the opposite end of each of the spring members to the body of said stator, whereby rotation of the rotor member about the pivot axis causes the legs of the rotor member to be oppositely and variably displaced with respect to the body of said stator member to thus initiate inductance reactance changes for each of said coils.

References Cited by the Examiner

UNITED STATES PATENTS

| | | | |
|---|---|---|---|
| 2,210,970 | 8/40 | Bonell | 73—517 |
| 2,498,118 | 2/50 | Weiss | 73—516 |
| 2,637,839 | 5/53 | Piety. | |
| 2,657,353 | 10/53 | Wiancko | 73—517 |
| 2,812,398 | 11/57 | Mickman | 73—514 |
| 2,959,252 | 11/60 | Jamieson | 73—516 |
| 2,991,339 | 7/61 | Williams | 200—61.46 |

FOREIGN PATENTS 159,078   6/57   Sweden.

RICHARD C. QUEISSER, *Primary Examiner.*

JOSEPH P. STRIZAK, *Examiner.*